US006918174B2

(12) United States Patent
Kim et al.

(10) Patent No.: US 6,918,174 B2
(45) Date of Patent: Jul. 19, 2005

(54) TOOL-LESS MODULAR REMOVABLE HARD DISK DRIVE (HDD) APPARATUS

(75) Inventors: David K. Kim, San Jose, CA (US); William W. Ruckman, San Jose, CA (US); Brett C. Ong, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 231 days.

(21) Appl. No.: 10/274,831

(22) Filed: Oct. 21, 2002

(65) Prior Publication Data

US 2004/0074082 A1 Apr. 22, 2004

(51) Int. Cl.[7] .......................... G11B 5/127; H04R 31/00
(52) U.S. Cl. ...................... 29/603.04; 29/428; 29/453; 29/469; 29/525; 29/603.01; 248/682; 248/694; 360/97.01; 360/97.02; 361/685; 361/724; 361/726
(58) Field of Search ......................... 29/428, 453, 469, 29/525, 603.1, 603.04; 361/685, 724, 726; 248/682, 694; 360/97.01, 97.02

(56) References Cited

U.S. PATENT DOCUMENTS 5,483,419 A * 1/1996 Kaczeus et al. ............ 361/685
5,748,442 A * 5/1998 Toor ........................... 361/685
6,052,278 A * 4/2000 Tanzer et al. ............... 361/685
6,088,222 A * 7/2000 Schmitt et al. .............. 361/686

FOREIGN PATENT DOCUMENTS

JP          01243287 A  *  9/1989  ........... G11B/33/08

OTHER PUBLICATIONS

"Thermal design of a desktop computer system using CFD analysis"; Yu, C.–W.; Webb, R.L.; Semiconductor Thermal Measurement and Management, 2001. Seventeenth Annual IEEE Symposium, Mar. 20–22, 2001; pp.: 18–26.*

* cited by examiner

Primary Examiner—Paul Kim
(74) Attorney, Agent, or Firm—Blakely Sokoloff Taylor & Zafman, LLP

(57) ABSTRACT

Disclosed are novel methods and apparatus for provision of an efficient, effective, and/or flexible removable HDD cartridge. In accordance with an embodiment of the present invention, an apparatus for holding a removable assembly (3) is disclosed. The apparatus comprising: a cage (2) to hold the assembly, a cage bracket (1) slideably engaging the cage (2), and a latch (6) coupled to the cage. The cage may include a plurality of slide receptacles (20). The assembly may include a plurality of slides (19) slideably engaging the plurality of slide receptacles (20). The cage bracket may be mountable on an external device. The latch may include a latch cap (9) and a locking lip (11). The locking lip may engage a receptacle (12) on the cage bracket to lock together the cage bracket and the cage.

18 Claims, 6 Drawing Sheets

TOOL-LESS MODULAR REMOVABLE HARD DISK DRIVE (HDD) APPARATUS

FIELD OF INVENTION

The present invention generally relates to the field of removable apparatus. More specifically, an embodiment of the present invention relates to a modular and removable hard disk drive (HDD) that can be removed or installed without the utilization of customary tools.

BACKGROUND OF INVENTION

HDDs are commonly utilized to store relatively large amounts of data in today's computer systems. HDDs are especially useful in situations where a user may need to access a relatively large amount of data reasonably quickly, for example, as compared with accessing an archived tape copy. This use is becoming even more commonplace as HDDs become increasingly cheaper while providing a larger storage capacity. Moreover, as the new technologies such as video capturing and digital image storage become more commonplace, large capacity HDDs become an ever more important part of a computer system.

In fact, today's computer systems are often shipped with HDDs having capacities over 80 GB. These systems are, however, hard to backup and lack appropriate traditional backup capabilities. For example, a tape backup system capable of backing up an 80 GB HDD can cost more than the entire computer system housing the HDD.

Additionally, removing an HDD from most computer systems today requires tools and involves pulling 25 to 50-pin cables from cable sockets. Overtime, or through incorrect usage, these cables or sockets become frail and can introduce data transfer errors associated with the HDD in use. Installing an HDD is not any easier because it involves similar hardships.

Furthermore, a computer data center (also referred to as an Internet data center or an enterprise data center) may contain a myriad of computer systems utilizing various HDDs. The large number of high-capacity HDDs in a data center poses significant problems associated with their removal and installation. The time and skills involved in removing or installing HDDs in a data center can become burdensome.

Accordingly, it is becoming extremely important for various reasons (such as data backup and generally switching HDDs) to be able to easily, quickly, and efficiently remove and install an HDD in a computer system.

SUMMARY OF INVENTION

The present invention, which may be utilized in a general-purpose digital computer, in certain embodiments, includes novel methods and apparatus to provide an efficient, effective, and/or flexible removable HDD cartridge. In accordance with an embodiment of the present invention, an apparatus for holding a removable assembly (3) is disclosed. The apparatus comprising: a cage (2) to hold the assembly, a cage bracket (1) slideably engaging the cage (2), and a latch (6) coupled to the cage. The cage may include a plurality of slide receptacles (20). The assembly may include a plurality of slides (19) slideably engaging the plurality of slide receptacles (20). The cage bracket may be mountable on an external device. The latch may include a latch cap (9) and a locking lip (11). The locking lip may engage a receptacle (12) on the cage bracket to lock together the cage bracket and the cage.

In another embodiment of the present invention, pressing the latch cap may disengage the locking lip and the receptacle.

In a further embodiment of the present invention, the locking lip may engage the receptacle (12) to keep the cage and the cage bracket engaged during vibration and/or shock to the apparatus.

In yet another embodiment of the present invention, the cage may be removable from the cage bracket without requiring any tools and/or the assembly may be removable from the cage without requiring any tools.

In an additional embodiment, the cage may be constructed with modular pieces.

In a different embodiment of the present invention, the latch may be spring-loaded.

BRIEF DESCRIPTION OF DRAWINGS

The present invention may be better understood and its numerous objects, features, and advantages made apparent to those skilled in the art by reference to the accompanying drawings in which.

The use of the same reference symbols in different drawings indicates or identical items.

DETAILED DESCRIPTION

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment.

Figure 1:
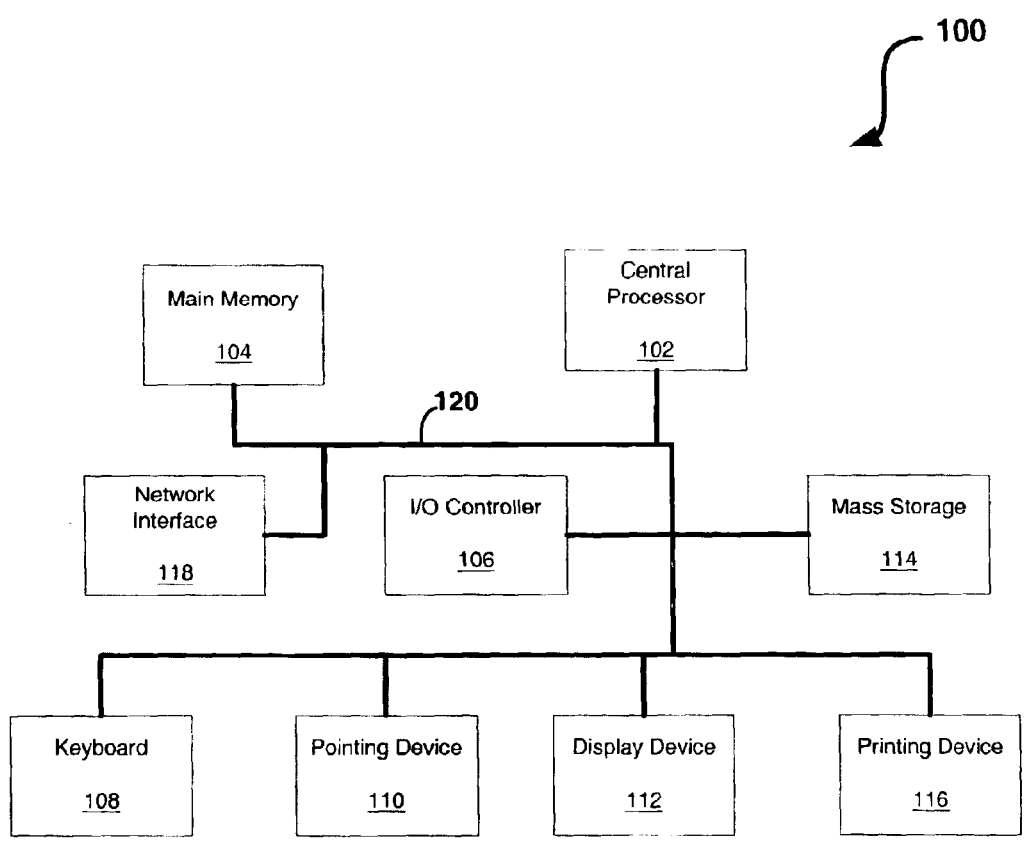
FIG. 1 illustrates an exemplary computer system 100 in which certain embodiments of the present invention may be implemented.

FIG. 1 illustrates an exemplary computer system 100 in which certain embodiments of the present invention may be implemented. The system 100 comprises a central processor 102 (or central processing unit (CPU)), a main memory 104, an input/output (I/O) controller 106, a keyboard 108, a pointing device 110 (e.g., mouse, track ball, pen device, or the like), a display device 112, a mass storage 114 (e.g., a nonvolatile storage such as a hard disk drive, an optical drive, and the like), and a network interface 118. Additional input/output devices, such as a printing device 116, may be included in the system 100 as desired. As illustrated, the various components of the system 100 communicate through a system bus 120 or similar architecture.

In accordance with an embodiment of the present invention, the computer system 100 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments of the present invention, the network interface 118 can be implemented utilizing technologies including, but not limited to, Ethernet, Fast Ethernet, wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, time division multiplexing (TDM), universal serial bus (USB and its varieties such as USB II), asynchronous transfer mode (ATM), satellite, cable modem, and/or FireWire.

Moreover, the computer system 100 may utilize operating systems such as Solaris, Windows (and its varieties such as CE, NT, 2000, XP, ME, and the like), HPUX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 100 is a general purpose computer capable of running any number of applications such as those available from companies including Oracle, Siebel, Unisys, Microsoft, and the like.

Figure 2:
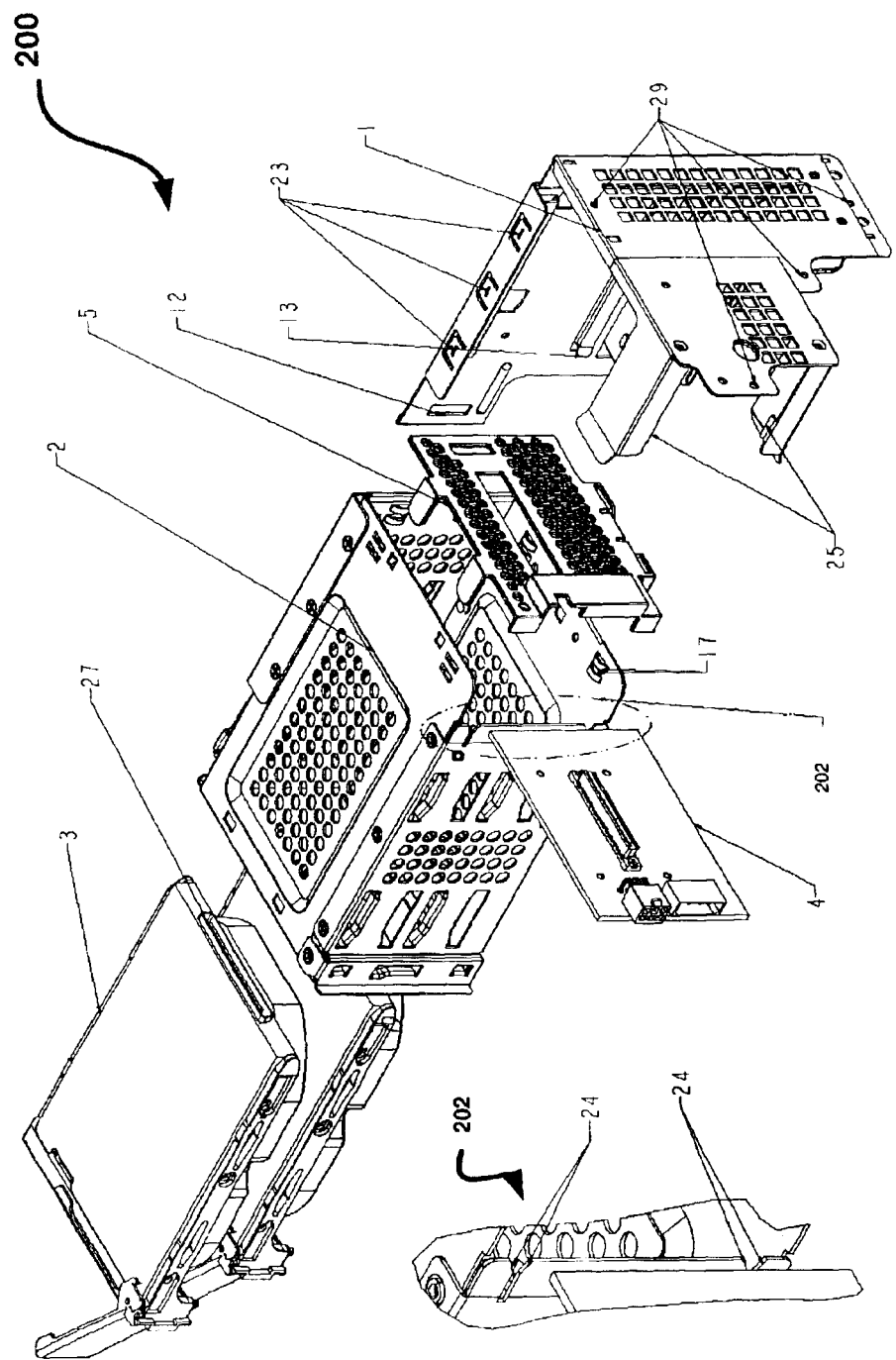
FIG. 2 illustrates an exemplary partial exploded perspective rear view of a removable HDD system 200 in accordance with an embodiment of the present invention.

FIG. 2 illustrates an exemplary partial exploded perspective rear view of a removable HDD system 200 in accordance with an embodiment of the present invention. In one embodiment of the present invention, the HDD system 200 may be utilized in the computer system 100 of FIG. 1 as, for example, the mass storage 114. The HDD system 200 include a HDD cage bracket (1), a HDD cage (2), one or more (e.g., two in FIG. 2) small computer system interface (SCSI) HDD assemblies (3), a SCSI back plane printed circuit board (PCB) (4), a SCSI back plane PCB cover (5) (e.g., to physically and/or electrically protect the PCB back plane), a receptacle (12), a guiding rail (13), guiding lips (17), locking tabs (23), guiding tabs (24), guiding plugs (25), one or more HDD connectors (27), and mounting holes (29). As illustrated, a section 202 of the FIG. 2 (including the guiding tabs (24)) is shown enlarged on the left hand side of FIG. 2.

The HDD cage bracket (1) may be attached to a computer chassis (not shown) through the mounting holes (29). It is envisioned that any type of fastener may be utilized such as metallic screws, plastic screws, plastic taps, spot welding, rivets, and the like. Metallic fasteners may be beneficial, in accordance with an embodiment of the present invention, in that they may provide an electrical contact with the chassis, for example, for electrical and/or electromagnetic interference (EMI) grounding. In one embodiment of the present invention, the HDD cage bracket (1) and/or the HDD cage (2) may be constructed with metallic material such as aluminum, steel, cold-rolled steel, copper, metalized vacuum-formed plastic, alloys/combinations thereof, and the like. Such material may provide rigidity in addition to electrical and/or grounding.

For installation of the HDD system 200, the HDD assemblies (3) can be slid into the pre-assembled HDD cage (2) by engaging the guiding rail (13) and guiding plugs (25). In an embodiment of the present invention, the guiding rail (13) may have a tilted edge (as shown in FIG. 2) to, for example, assist in inserting the pre-assembled HDD cage (2) into the HDD cage bracket (1). The HDD cage (2) may then use the receptacle (12) to lock in position, as discussed further with respect to FIG. 4. To preassemble the HDD cage (2), the SCSI back plane PCB (4) may be slid through the guiding lips (17) and covered by the SCSI back plane PCB cover (5). The locking tabs (23) and guiding tabs (24) may also assist in sliding and/or locking the pre-assembled HDD cage (2) into the HDD cage bracket (1), so that the HDD connectors (27) may properly engage the connector on the SCSI back plane PCB (4) (which is further discussed with respect to mating connectors (26) of FIG. 4).

In an embodiment of the present invention, other types of peripheral connections such as integrated drive electronics (IDE), enhanced IDE (EIDE), FireWire, Fast SCSI, Ultra SCSI, and the like may be utilized instead of, or in conjunction with, the SCSI assemblies (3). In a further embodiment of the present invention, the HDD cage bracket (1), the HDD cage (2), and/or the SCSI back plane PCB cover (5) may include breathing holes (or openings) to provide air circulation, for example, to provide cooling.

Figure 3:
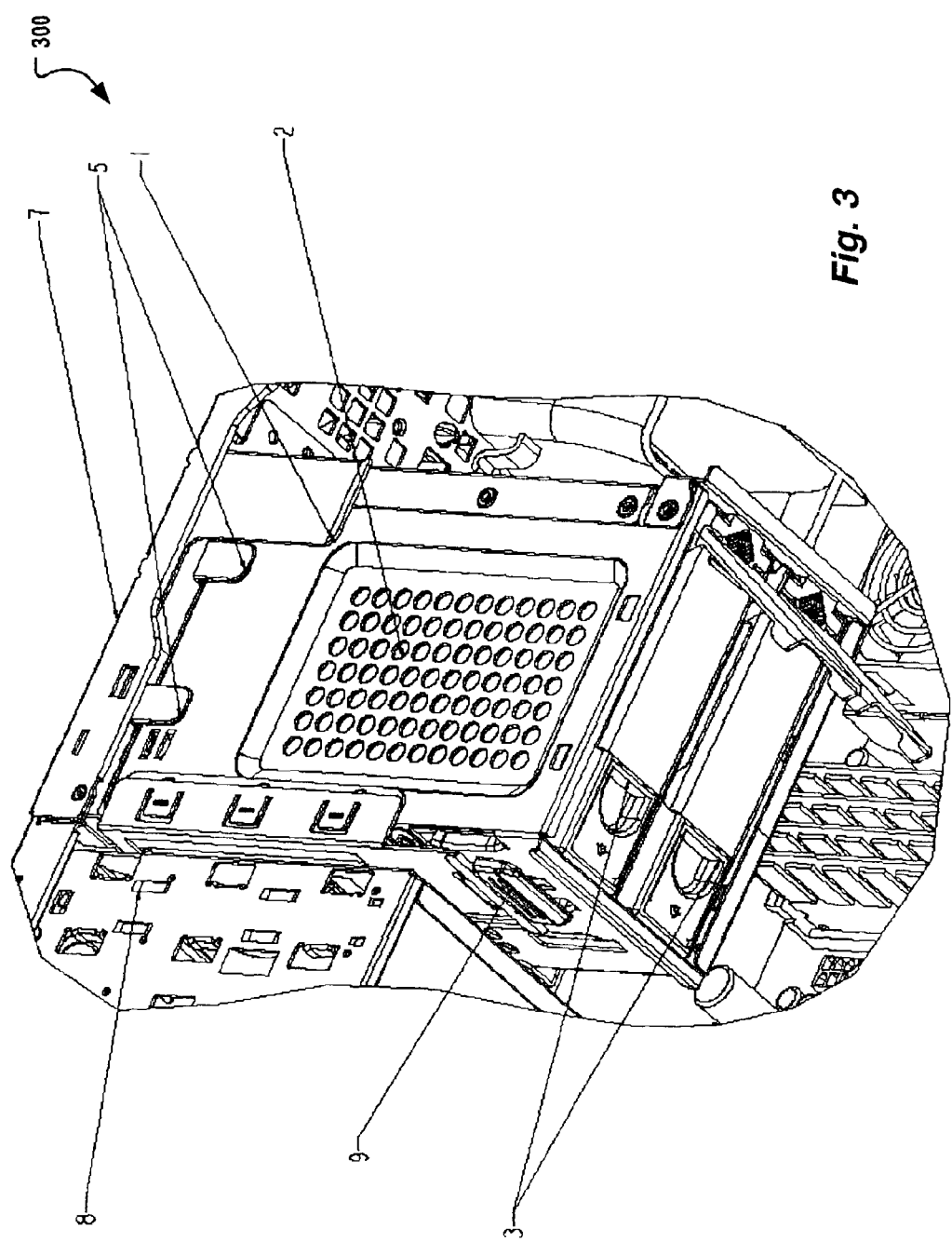
FIG. 3 illustrates an exemplary partial perspective top front view of an HDD system 300 in accordance with an embodiment of the present invention.

FIG. 3 illustrates an exemplary partial perspective top front view of an installed HDD system 300 in accordance with an embodiment of the present invention. In one embodiment of the present invention, the HDD system 300 may be the same or similar to the HDD system 200 of FIG. 2. The HDD system 300 includes the HDD cage bracket (1), the HDD cage (2), one or more SCSI HDD assemblies (3), the SCSI back plane PCB cover (5), an enclosure (7) (which may be a computer system chassis in an embodiment of the present invention), a device cage (8), and a latch cap (9).

The device cage (8) may be a media bay for devices such as 5¼-inch devices, 3½-inch devices, and/or smart card readers. As discussed with respect to FIG. 3, the enclosure (7) may be utilized to secure the HDD cage bracket (1). Also, a mechanical fastener may be utilized to attach the HDD cage bracket (1) to the enclosure (7) through the provided mounting holes (29). It is envisioned that any type of fastener may be utilized such as metallic screws, plastic screws, plastic taps, spot welding, rivets, and the like. Metallic fasteners may be beneficial, in accordance with an embodiment of the present invention, in that they may provide an electrical contact with the chassis, for example, for electrical and/or EMI grounding.

In a further embodiment of the present invention, the latch cap (9) may be constructed with plastic material to, for example, protect the operator from sharp edges and/or static electric shock, or to provide ease of service. It is, however, envisioned that any material may be utilized for the latch cap (9) such as metal, wood, rubber, and the like. The latch cap (9) may engage the receptacle (12) of FIG. 2 to secure the installed HDD system 300 (as will be further discussed in reference to FIG. 4).

Figure 4:
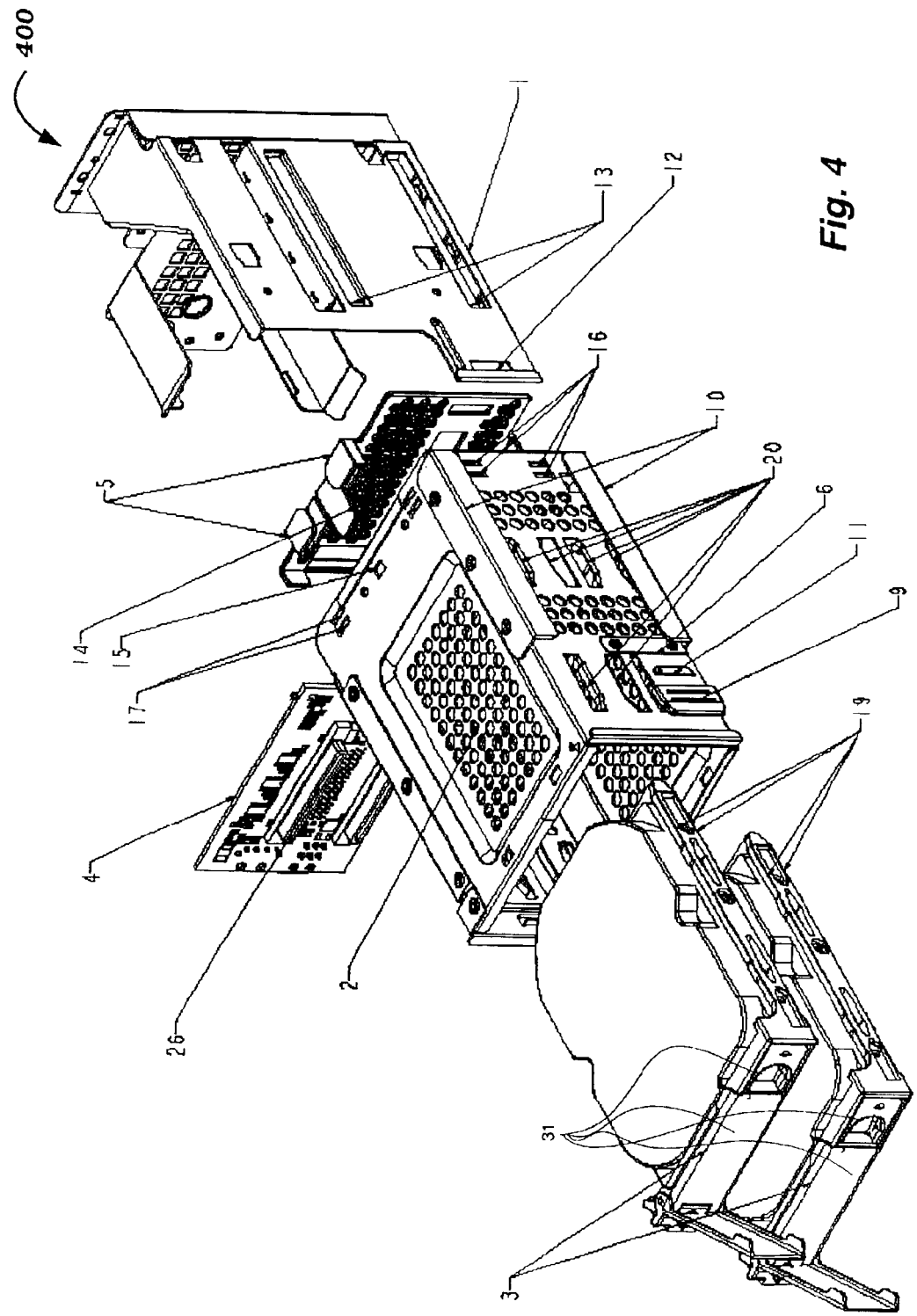
FIG. 4 illustrates an exemplary partial exploded perspective front view of system 400 in accordance with an embodiment of the present invention.

FIG. 4 illustrates an exemplary partial exploded perspective front view of an HDD system 400 in accordance with an embodiment of the present invention. In one embodiment of the present invention, the HDD system 400 may be the same or similar to one or more of the HDD systems 200 of FIG. 2 and 300 of FIG. 3. The HDD system 400 includes the HDD cage bracket (1), the HDD cage (2), one or more SCSI HDD assemblies (3), a SCSI back plane PCB (4), a SCSI back plane PCB cover (5), a latch (6), one or more rails (10), a locking lip (11), the receptacle (12), the guiding rail (13), a holder (14), one or more cable holder taps (15), side guiding lips (16), the guiding lips (17), HDD slides (19), HDD slide receptacles (20), and mating connectors (26).

In accordance with an embodiment of the present invention, the latch (6) having the locking lip (11) may engage the receptacle (12) once the HDD cage (2) fully engages the HDD cage bracket (1). To release the HDD cage (2), the latch cap (9) may be pushed by an operator to release the HDD cage (2) from the HDD cage bracket (1). In one embodiment of the present invention, the latch (6) may have a spring-loaded positive lock. Through the positive lock and the receptacle (12) and the locking lip (11), it is envisioned that back out during shock and/or vibration may be reduced or prevented. Also, a better electrical and/or EMI ground may be provided by the positive lock connection between the HDD cage (2) and the HDD cage bracket (1). Accordingly, the HDD system 400 may be installed or removed relatively quickly and efficiently, for example, without usage of any customary mechanical fasteners.

In another embodiment of the present invention, the rails (10), the locking tabs (23), the guiding tabs (24), the guiding rail (13), and/or the guiding plugs (25) assist in engaging and/or sliding the HDD cage (2) into the HDD cage bracket (1). The rails (10) may also provide structural rigidity to protect the HDD assemblies (3).

The holder (14) may assist in keeping the installed HDD assemblies (3) in place during vibrations and/or shocks. Moreover, the holder (14) may push back the HDD cage (2) to its appropriate position until the positive stop is reached (e.g., by utilizing 11 and 12). It is envisioned that the HDD assemblies (3) may be locked into the HDD cage (2) by one or more of assembly latches (31). The cable holder taps (15) may be utilized to insert cable holders (not shown) to hold cables used organized and/or out of the way so that HDD assemblies (3) and/or the pre-assembled HDD cage (2) may be moved, for example, for installation or removal. The side guiding lips (16) may help in insertion and/or holding the back plane PCB (4) in the HDD cage (2). The HDD slides (19) may assist in sliding the HDD assemblies (3) into the HDD cage (2).

The HDD slides (19) may be attached to the HDD assemblies (3) with any type of fastener such as metallic screws, plastic screws, plastic taps, spot welding, rivets, and the like. The HDD slide receptacles (20) may assist in sliding the HDD slides (19) into the HDD cage (2). In an embodiment of the present invention, the HDD slide receptacles (20) may be formed by cutting and bending the surface of the HDD cage (2). The mating connectors (26) may engage the HDD connectors (27) to provide a communication channel for data to be transferred between the HDD assemblies and a computer system (not shown). Power may be provided to the HDD assemblies through the same connectors or others (not shown), such as a standard four-pin power cable. Utilizing the mating connectors (26) instead of the traditional (e.g., 25 or 50-pin) cables may improve the speed at which the assemblies (3) may be removed and/or installed into the cage (2). Also, the relatively sturdier mating connectors (26) may avoid problems that may be introduced (e.g., data errors) by, for example, the traditional cable connectors.

Figure 5:
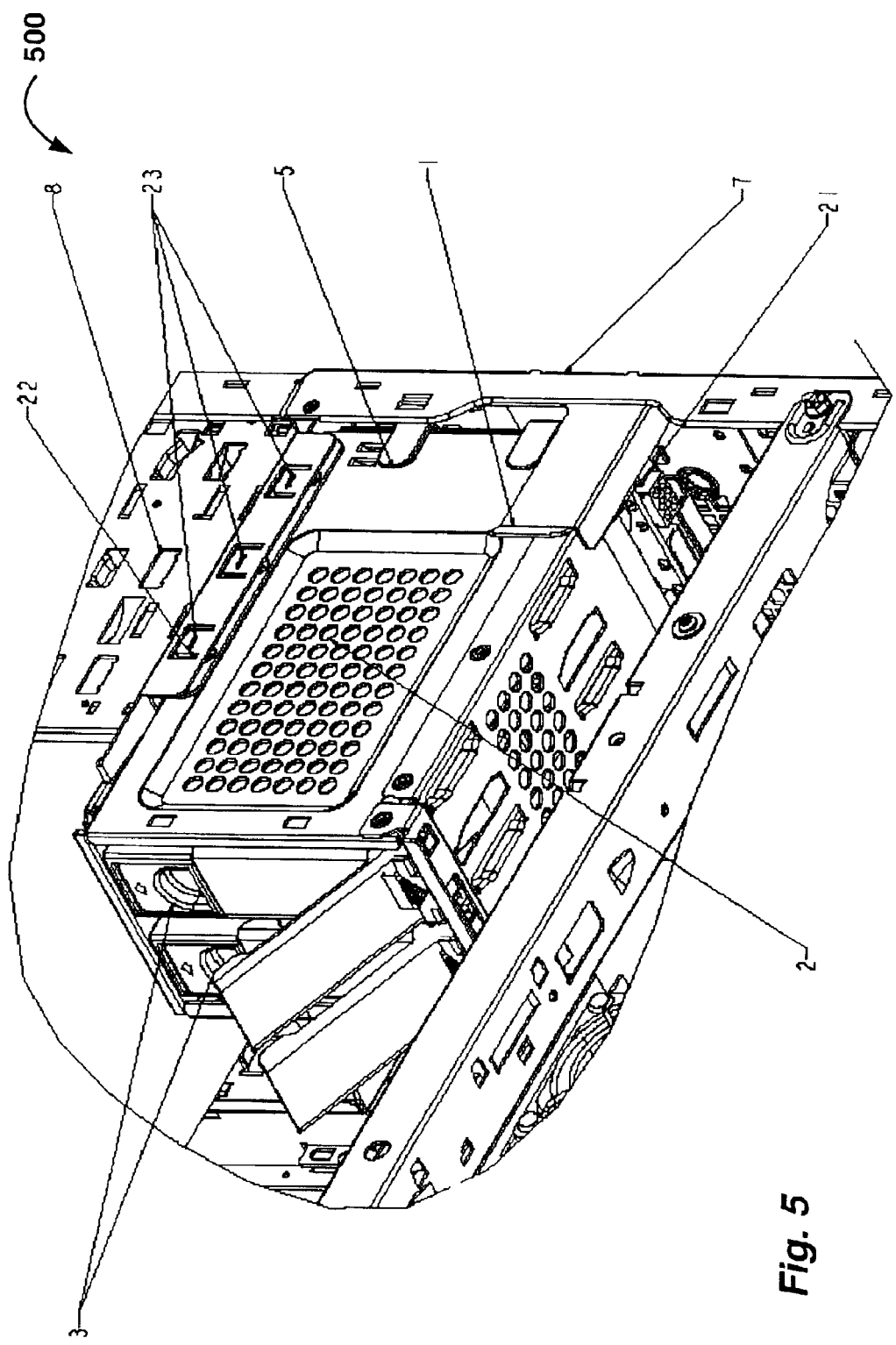
FIG. 5 illustrates an exemplary partial perspective top front view of an stem 500 in accordance with an embodiment of the present invention.

FIG. 5 illustrates an exemplary partial perspective ton front view of an HDD system 500 in accordance with an embodiment of the present invention. In one embodiment of the present invention, the HDD system 500 may be the same or similar to one or more of the HDD systems 200 of FIG. 2, 300 of FIG. 3, or 400 of FIG. 4. The HDD system 500 includes the HDD cage bracket (1), the HDD cage (2), one or more HDD assemblies (3), the enclosure (7), the device cage (8), a guiding rail (21), openings (22) surrounding the locking tabs (23), and the locking tabs (23).

In an embodiment of the present invention, the guiding rail (21) may have a tilted edge (as shown in FIG. 5, facing away from the enclosure (7)) to, for example, assist in inserting the pre-assembled HDD cage (2) into the HDD cage bracket (1). In a further embodiment of the present invention, the openings (22) surrounding the locking tabs (23) may assist in providing a spring-loaded action to lock in the HDD cage (2) into the HDD cage bracket (1). Also, as illustrated in for example FIG. 5, the locking tabs (23) may each include an indent to help in securing the HDD cage (2).

Figure 6:
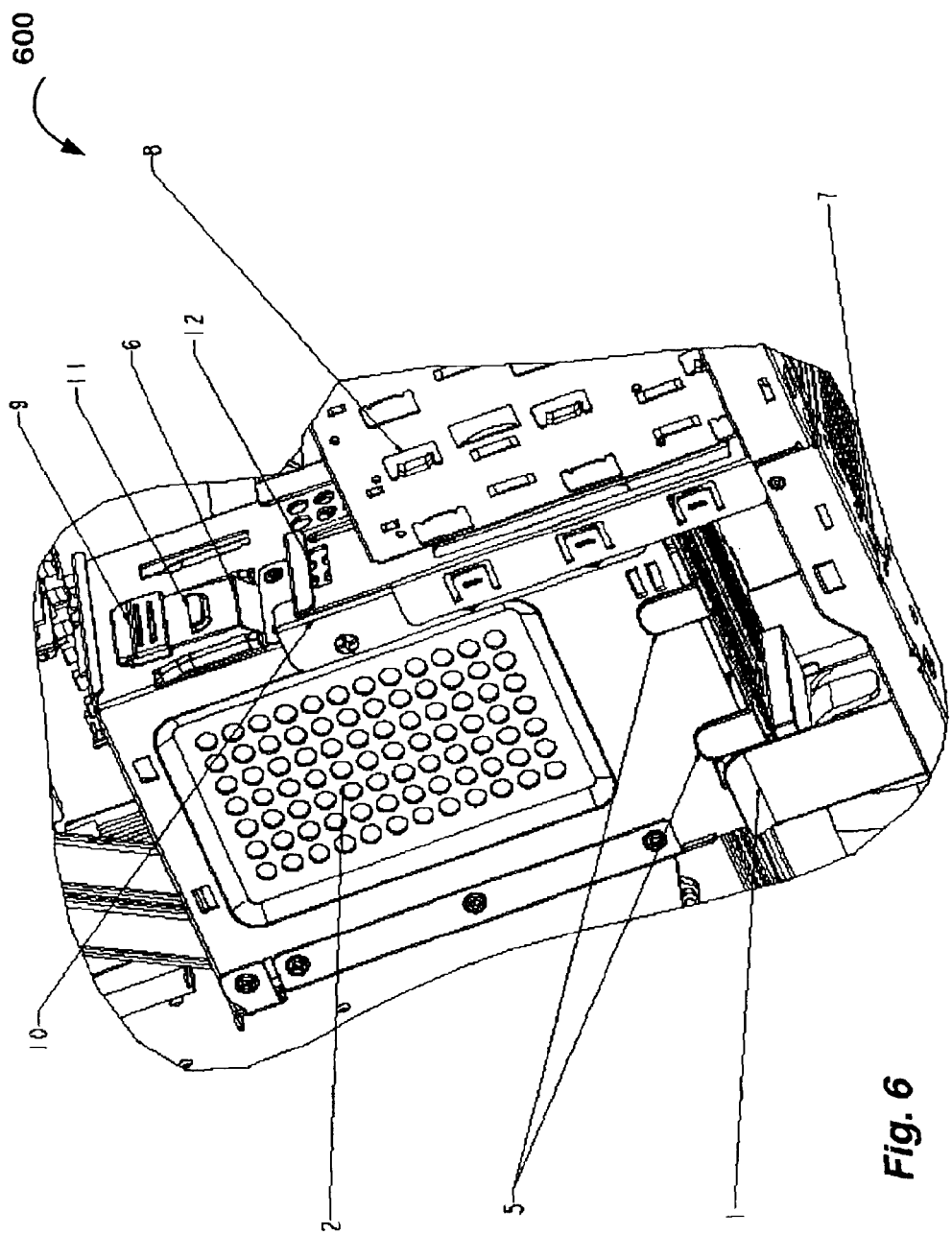
FIG. 6 illustrates an exemplary partial perspective top rear view of an HDD 600 in accordance with an embodiment of the present invention.

FIG. 6 illustrates an exemplary partial perspective top rear view of an HDD system 600 in accordance with an embodiment of the present invention. In one embodiment of the present invention, the HDD system 600 may be the same or similar to one or more of the HDD systems 200 of FIG. 2, 300 of FIG. 3, 400 of FIG. 4, or 500 of FIG. 5. The HDD system 600 includes the HDD cage bracket (1), the HDD cage (2), the back plane PCB cover (5), the latch (6), the enclosure (7), the device cage (8), the latch cap (9), the rails (10), the locking lip (11), and the receptacle (12).

In accordance with an embodiment of the present invention, a tool-less modular type removable HDD cartridge is disclosed. The tool-less HDD cartridge may be easily accessible, serviceable (e.g., without tools), and located optimally to efficiently utilize the limited real estate in desktop workstations, for example. The pre-assembly of the cartridge further enables relatively quicker upgrade or service of a computer system.

The foregoing description has been directed to specific embodiments of the present invention. It will be apparent to those with ordinary skill in the art that modifications may be made to the described embodiments of the present invention, with the attainment of all or some of the advantages. For example, the techniques of the present invention may be utilized in set-top boxes, blade computers, electronic gaming apparatus (such as those provided by Microsoft Corporation of Redmond, Wash. (e.g., XBOX game machine) and Sony Corporation of Japan (e.g., PlayStation game machine)), and devices available from SONICblue Inc. of Santa Clara, Calif. (such as ReplayTV and Rio MP3 players), and the like.

Also, the techniques of the present invention may be readily applied to redundant array of inexpensive disks (RAIDs) to, for example, provide serviceability. Moreover, even though only two HDDs may be illustrated in certain figures, it is envisioned that more or less HDDs may be utilized in various embodiments of the present invention. Furthermore, the techniques of the present invention are readily applicable to devices other than HDDs such as 5¼ inch and 3½ inch devices. Therefore, it is the object of the appended claims to cover all such variations and modifications as come within the spirit and scope of the invention.

What is claimed is:

1. An apparatus for holding a removable assembly (3), the apparatus comprising:

a cage (2) to hold the assembly, the cage having a plurality of slide receptacles (20), the assembly having a plurality of slides (19) slideably engaging the plurality of slide receptacles (20);

a cage bracket (1) slideably engaging the cage (2), the cage bracket being mountable on an external device;

a spring-loaded latch (6) coupled to the cage, the latch including a latch cap (9) and a locking lip (11), the locking lip engaging a receptacle (12) on the cage bracket to lock together the cage bracket and the cage.

2. The apparatus of claim 1 wherein the locking lip and the receptacle can be disengaged by pressing the latch cap.

3. The apparatus of claim 1 wherein the locking lip engages the receptacle (12) to keep the cage and the cage bracket engaged during a movement selected from a group comprising vibration and shock to the apparatus.

4. The apparatus of claim 1 wherein the latch cap is constructed with one or more material selected from a group comprising plastic, metal, wood, and rubber.

5. The apparatus of claim 1 wherein the external device is a computer system chassis.

6. The apparatus of claim 1 wherein the cage bracket is mounted on the external device by utilizing an item selected from a group comprising a metallic screw, a plastic screw, a plastic tap, a rivet, and spot welding.

7. The apparatus of claim 1 further including a printed circuit board (PCB) back plane slideably engaging the cage, the PCB back plane coupling to the assembly to provide a communication channel.

8. The apparatus of claim 7 wherein the communication channel operates utilizing one or more protocols selected from a group SCSI, IDE, EIDE, FireWire, Fast SCSI, and Ultra SCSI.

9. The apparatus of claim 7 further including a PCB back plane cover (5) attachable to the cage to protect the PCB back plane against an item selected from a group comprising physical damage and electrical damage.

10. The apparatus of claim 9 wherein the PCB back plane cover includes a holder (14) to keep the assembly in place during a movement selected from a group comprising vibration and shock.

11. The apparatus of claim 1 wherein the assembly is a hard disk drive (HDD) assembly.

12. The apparatus of claim 1 wherein the cage is constructed with one or more material selected from a group comprising aluminum, steel, copper, cold-rolled steel, alloys thereof, and metalized vacuum-formed plastic.

13. The apparatus of claim 1 wherein the cage bracket is constructed with a material selected from a group comprising aluminum, steel, copper, cold-rolled steel, alloys thereof, and metalized vacuum-formed plastic.

14. The apparatus of claim 1 wherein the cage holds a plurality of assemblies.

15. The apparatus of claim 1 wherein the cage bracket is removably attached to a computer system.

16. The apparatus of claim 1 wherein the cage is removable from the cage bracket without requiring any tools.

17. The apparatus of claim 1 wherein the assembly is removable from the cage without requiring any tools.

18. The apparatus of claim 1 wherein the cage is constructed with modular pieces.

* * * * *